United States Patent
Saito et al.

(10) Patent No.: US 6,687,075 B1
(45) Date of Patent: Feb. 3, 2004

(54) RECORDING-MEDIUM HOLDER INSERTION DETECTION APPARATUS

(75) Inventors: Kenji Saito, Sagamihara (JP); Ikuichiro Nawa, Atsugi (JP)

(73) Assignee: Mitsumi Electronic Co., Ltd., Tokyo (JP)

( * ) Notice: Subject to any disclaimer, the term of this patent is extended or adjusted under 35 U.S.C. 154(b) by 659 days.

(21) Appl. No.: 09/611,055

(22) Filed: Jul. 6, 2000

(30) Foreign Application Priority Data

Jul. 8, 1999 (JP) .......................................... 11-194745

(51) Int. Cl.⁷ .............................................. G11B 15/18
(52) U.S. Cl. ....................................................... 360/69
(58) Field of Search ........................... 360/69, 96.5, 94, 360/99.03, 79

(56) References Cited

U.S. PATENT DOCUMENTS

| | | | | | |
|---|---|---|---|---|---|
| 4,379,313 A | * | 4/1983 | Tsuchiya | ................... | 360/96.5 |
| 4,656,544 A | * | 4/1987 | Yamanouchi | ............ | 360/99.03 |
| 4,858,042 A | * | 8/1989 | Ito et al. | ..................... | 360/96.5 |
| 4,965,683 A | * | 10/1990 | Otani | .......................... | 360/94 |
| 5,396,381 A | * | 3/1995 | Yamano et al. | ............ | 360/96.5 |
| 5,420,732 A | * | 5/1995 | Scholz et al. | .............. | 360/96.5 |
| 6,023,142 A | * | 2/2000 | Inschlag | ..................... | 318/591 |

* cited by examiner

Primary Examiner—David Hudspeth
Assistant Examiner—Fred F. Tzeng
(74) Attorney, Agent, or Firm—Ladas & Parry

(57) ABSTRACT

A recording-medium holder insertion detection apparatus includes a motor which is engaged with the recording-medium holder placed at a first position within a recording/reproducing system, the motor moving the holder in an insertion direction from the first position when the motor is rotated by a drive voltage, and the motor generating an alternating voltage when the motor is rotated by a manual insertion of the holder so as to reach a second position. A detection circuit outputs a pulsed signal in response to the alternating voltage generated by the motor. A determination unit calculates a distance of the holder away from the first position in the insertion direction based on the pulsed signal output by the detection circuit, and outputs a drive-start signal when the calculated distance has reached a predetermined distance between the first position and the second position.

6 Claims, 4 Drawing Sheets

RECORDING-MEDIUM HOLDER INSERTION DETECTION APPARATUS

BACKGROUND OF THE INVENTION

1. Field of the Invention

The present invention generally relates to a recording-medium holder insertion detection apparatus, and more particularly to a recording-medium holder insertion detection apparatus which detects an insertion of a cassette holder into a housing of a magnetic recording/reproducing system, such as a digital audio tape (DAT) recorder system.

In recent years, there have been the demands for inexpensive, lightweight magnetic recording/reproducing systems, and there is the increasing demand for a cassette holder insertion detection apparatus having an inexpensive, lightweight structure that is appropriate for use in the magnetic recording/reproducing systems.

2. Description of the Related Art

FIG. 4 shows a conventional recording-medium-holder insertion detection apparatus. The conventional insertion detection apparatus is provided for use in a digital audio tape (DAT) recording/reproducing system.

As shown in FIG. 4, a cassette holder 104 includes a DAT cassette 110 provided therein. The cassette holder 104 is inserted into the recording/reproducing system so as to reproduce information recorded in the DAT of the cassette 110. The conventional insertion detection apparatus is configured such that the cassette holder 104, when inserted, is movable between an insert/eject position and a tape-loaded position in a housing 102 of the recording/reproducing system. With the cassette holder 104 being set at the tape-loaded position, the recording/reproducing system can reproduce information recorded in the DAT of the cassette 110.

In the conventional insertion detection apparatus of FIG. 4, the cassette holder 104 is provided with a projection 112, which is formed on the bottom of the cassette holder 104 so as to downwardly extend from the bottom of the cassette holder 104. In the housing 102 of the recording/reproducing system, a position-sensing switch 106 is provided at a given position, and the position-sensing switch 106 includes a knob 114, which upwardly extends from the top of the position-sensing switch 114.

When the cassette holder 104 at the insert/eject position is manually pushed by an operator in the insertion direction indicated by the arrow "X1" in FIG. 4, to reach the given position where the position-sensing switch 106 is provided, the projection 112 on the bottom of the cassette holder 104 is brought into contact with the knob 114 on the top of the position-sensing switch 106. The position-sensing switch 106 is turned ON by the contact of the projection 112 with the knob 114, which outputs a detection signal, which indicates that the manual insertion of the cassette holder 104 into the housing 102 is detected, to a system control unit 108.

When the detection signal output by the switch 106 is received at the system control unit 108, the system control unit 108 supplies a drive signal to a motor driver (not shown). In response to the drive signal supplied by the system control unit 108, the motor driver supplies a drive voltage to a loading motor (not shown) so that the loading motor is rotated by the drive voltage. The rotating force of the loading motor is transmitted to the cassette holder 104 through gears, so that the cassette holder 104 is further moved in the insertion direction to the tape-loaded position. With the cassette holder 104 being set at the tape-loaded position, the recording/reproducing system can reproduce information recorded in the DAT of the cassette 110.

In the conventional insertion detection apparatus described above, the manual insertion of the cassette holder 104 into the housing 102 is detected by using the position-sensing switch 106 when the projection 112 on the bottom of the cassette holder 104 is brought into contact with the knob 114 on the top of the position-sensing switch 106.

However, in the above conventional insertion detection apparatus, the misalignment of the projection 112 on the cassette holder 104 and/or the misalignment of the knob 114 on the position-sensing switch 106 are likely to occur, which will result in a poor contact between the projection 112 and the knob 114. In such a case, even when the cassette holder 104 at the insert/eject position is manually inserted to reach the given position where the position-sensing switch 106 is provided, the position-sensing switch 106 is not turned ON due to the poor contact, and no detection signal is supplied from the position-sensing switch 106 to the system control unit 108. As the system control unit 108 supplies no drive signal to the motor driver, the motor driver does not supply a drive voltage to the loading motor in order to generate a rotating force of the loading motor. Hence, the cassette holder 104 is not moved in the insertion direction to the tape-loaded position, and the recording/reproducing system cannot reproduce information recorded in the DAT of the cassette 110.

In order to eliminate the above problem, in the conventional insertion detection apparatus, the alignment of the projection 112 on the cassette holder 104 and the alignment of the knob 114 on the switch 106 must be carried out with high accuracy. This will cause the manufacture of the conventional insertion detection apparatus to become costly and complicated. Hence, it is difficult for the conventional insertion detection apparatus to detect the manual insertion of the cassette holder in the recording/reproducing system by using a lightweight, low-cost structure. The conventional insertion detection apparatus employs the position-sensing switch 106, and it requires the highly accurate alignment of the projection 112 and the knob 114 in order to provide a safe, reliable detection of the insertion of the cassette holder 104 in the recording/reproducing system.

SUMMARY OF THE INVENTION

In order to overcome the above-described problems, preferred embodiments of the present invention provide a recording-medium holder insertion detection apparatus that provides a safe, reliable detection of the insertion of the cassette holder in the recording/reproducing system by using a lightweight, inexpensive structure.

According to one preferred embodiment of the present invention, an apparatus for detecting an insertion of a recording-medium holder in a recording/reproducing system, includes: a motor which is engaged with the recording-medium holder, placed at a first position within the recording/reproducing system, the motor moving the holder in an insertion direction from the first position when the motor is rotated by a drive voltage, and the motor generating an alternating voltage when the motor is rotated by a manual insertion of the holder so as to reach a second position; a detection circuit which outputs a pulsed signal in response to the alternating voltage generated by the motor; and a determination unit which calculates a distance of the holder away from the first position in the insertion direction based on the pulsed signal output by the detection circuit, and outputs a drive-start signal when the calculated distance has reached a predetermined distance between the first position and the second position.

The recording-medium holder insertion detection apparatus of the present invention is effective in providing a safe, reliable detection of the insertion of the cassette holder in the recording/reproducing system by using a lightweight, inexpensive structure.

BRIEF DESCRIPTION OF THE DRAWINGS

Other objects, features and advantages of the present invention will become apparent from the following detailed description when read in conjunction with the accompanying drawings.

DETAILED DESCRIPTION OF PREFERRED EMBODIMENTS

A description will now be provided of preferred embodiments of the present invention with reference to the accompanying drawings.

Figure 1:
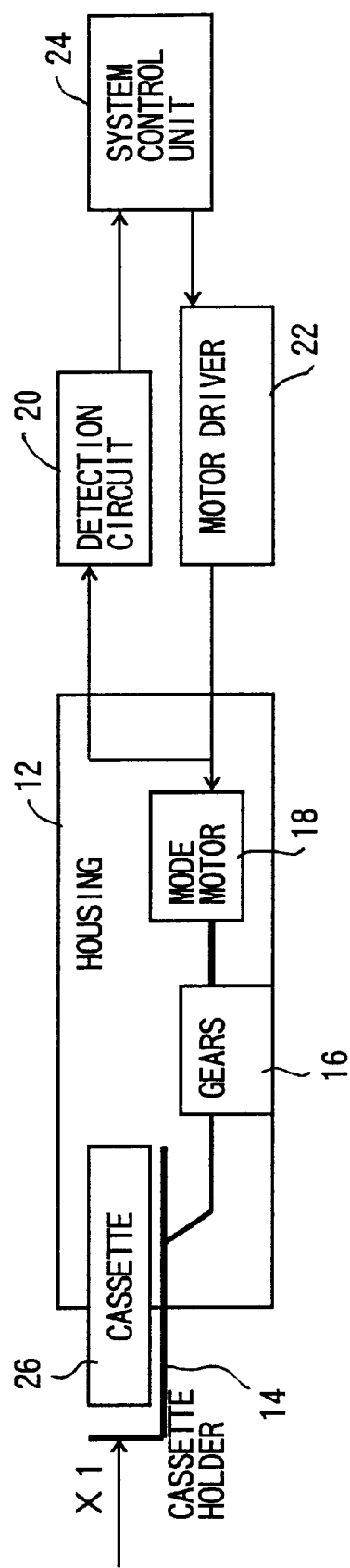
FIG. 1 is a block diagram of one preferred embodiment of the insertion detection apparatus of the invention.

FIG. 1 shows one preferred embodiment of the recording-medium-holder insertion detection apparatus of the present invention. Hereinafter, the recording-medium holder insertion detection apparatus of the invention will be called the insertion detection apparatus for the sake of simplicity.

As shown in FIG. 1, a cassette holder 14 contains a DAT cassette 26 that is provided in the holder 14. The cassette holder 14 is inserted into a DAT recording/reproducing system so as to reproduce information from the DAT of the cassette 26. The cassette holder 14 is configured so that the cassette holder 14 is movable between an insert/eject position and a tape-loaded position in a housing 12 of the recording/reproducing system.

In the insertion detection apparatus of the present embodiment, a driver initiation position with respect to the cassette holder 14 is provided in the housing 12. A distance between the insert/eject position and the driver initiation position in the insertion direction of the cassette holder 14 is predetermined. When the cassette holder 14 at the insert/eject position is manually pushed by an operator in the insertion direction, indicated by the arrow "X1" in FIG. 1, and the cassette holder 14 reaches the driver initiation position, a system control unit 24 detects the manual insertion of the cassette holder 14 based on the output of a detection circuit 20, and starts rotation of a mode motor 18 through a motor driver 22 upon the detection of the manual insertion. By the rotation of the mode motor 18, the cassette holder 14 is further moved to the tape-loaded position. With the cassette holder 14 being set at the tape-loaded position, the recording/reproducing system can reproduce information recorded in the DAT of the cassette 26.

Specifically, in the insertion detection apparatus of the present embodiment, the cassette holder 14 at the insert/eject position is engaged with the mode motor 18 through gears 16. When the cassette holder 14 at the insert/eject position is manually pushed by the operator in the insertion direction "X1" from the insert/eject position to the driver initiation position, the manual insertion of the cassette holder 14 is transmitted to the mode motor 18 through the gears 16. This allows the mode motor 18 to be rotated in accordance with the manual insertion of the cassette holder 14. The mode motor 18 generates an alternating voltage (for example, about 400 mV) during the rotation of the mode motor 18 caused by the manual insertion of the cassette holder 14.

Further, when the cassette holder 14 reaches the driver initiation position, the system control unit 24 starts rotation of the mode motor 18 through the motor driver 22. The rotation of the mode motor 18 is transmitted through the gears 16 to the cassette holder 14, so that the cassette holder 14 is further moved to the tape-loaded position.

Figure 2A:
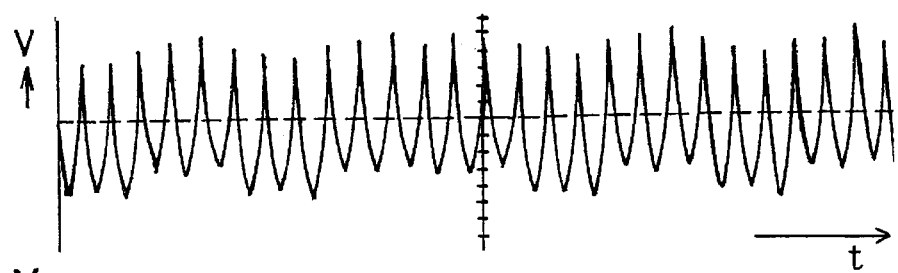
FIG. 2A and FIG. 2B are time charts for explaining the waveform of an alternating voltage that is generated when a mode motor is rotated by a manual insertion of a cassette holder in a recording/reproducing apparatus.
Figure 2B:
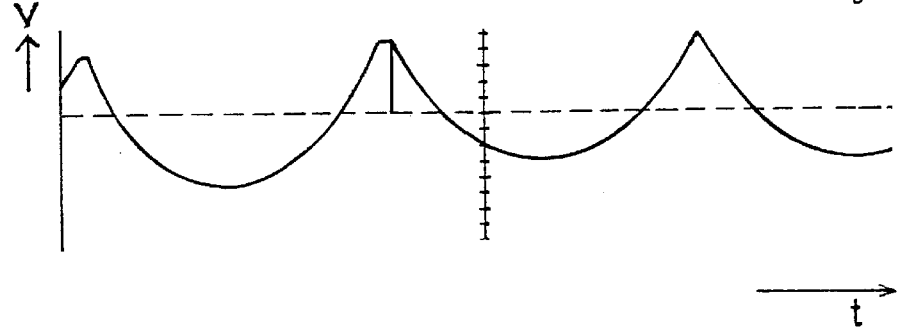

FIG. 2A and FIG. 2B show the waveform of an alternating voltage that is generated by the mode motor 18 when it is rotated by the manual insertion of the cassette holder 14 provided by the operator.

The waveform of the alternating voltage shown in FIG. 2B is provided by enlarging the waveform of the alternating voltage shown in FIG. 2A along the time axis of the time chart. In the present embodiment, the system control unit 24 determines whether the cassette holder 14 at the insert/eject position that is manually moved in the insertion direction has reached the driver initiation position, based on the alternating voltage generated by the mode motor 8, which will be described later.

Figure 3:
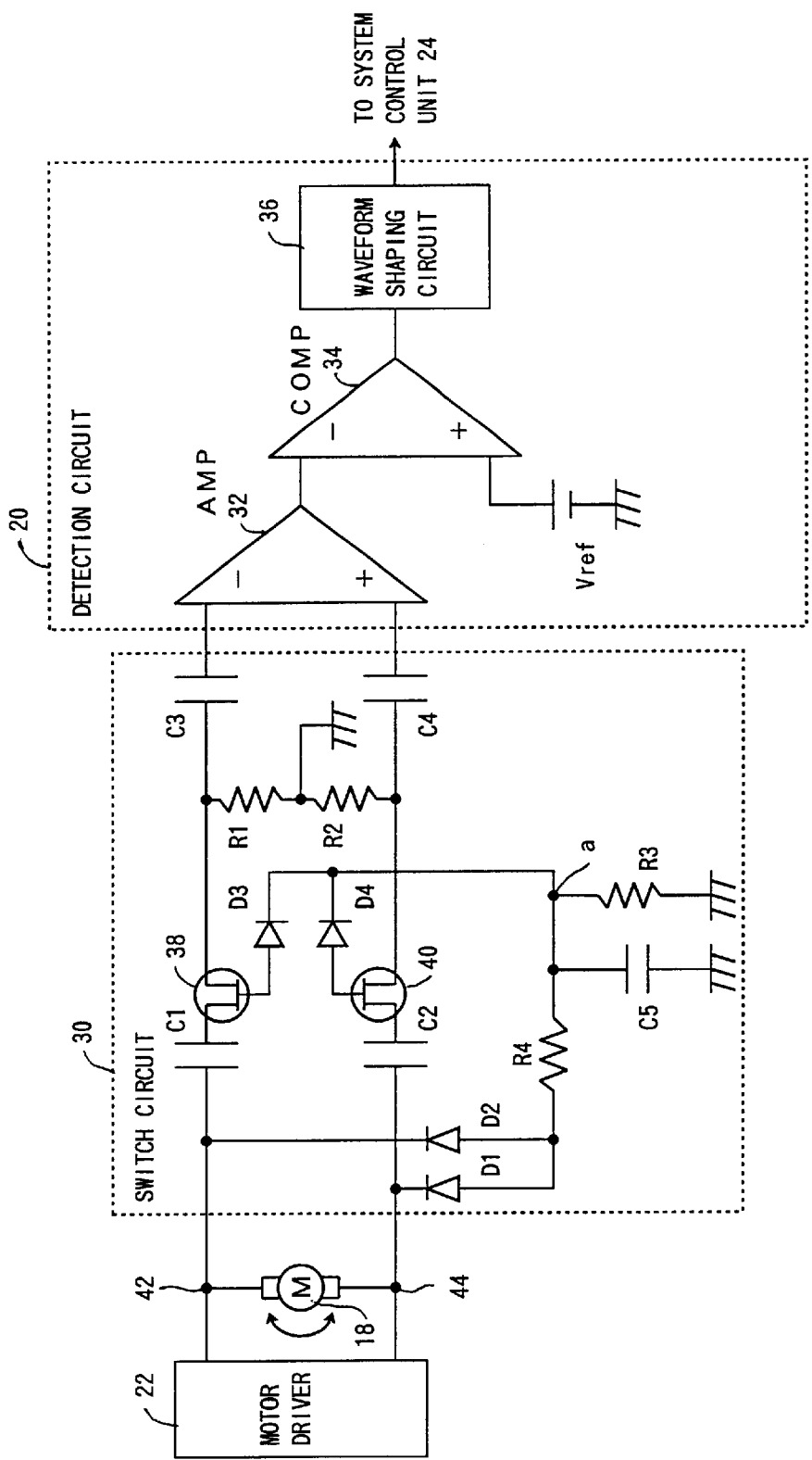
FIG. 3 is a circuit diagram of a detection circuit and a switch circuit in the insertion detection apparatus of the present embodiment.

FIG. 3 is a circuit diagram of a detection circuit 20 and a switch circuit 30 in the insertion detection apparatus of the present embodiment.

As shown in FIG. 3, the detection circuit 20 in the present embodiment generally comprises a differential amplifier 32, a comparator 34, and a waveform shaping circuit 36. Further, in the present embodiment, the switch circuit 30 is provided between the mode motor 18 and the detection circuit 20. The switch circuit 30 generally comprises a first diode D1, a second diode D2, a third diode D3, a fourth diode D4, a first capacitor C1, a second capacitor C2, a third capacitor C3, a fourth capacitor C4, a fifth capacitor C5, a first resistor R1, a second resistor R2, a third resistor R3, a fourth resistor R4, a first field-effect transistor (FET) 38, and a second field-effect transistor (FET) 40.

The motor driver 22 is connected to the mode motor 18 through first and second terminals 42 and 44. The first terminal 42 of the mode motor 18 is connected to both a first end of the first capacitor C1 and a cathode of the second diode D2, which are provided in the switch circuit 30. The second terminal 44 of the mode motor 18 is connected to both a cathode of the first diode D1 and a first end of the second capacitor C2, which are provided in the switch circuit 30. A second end of the first capacitor C1 is connected to a drain of the first FET 38. A second end of the second capacitor C2 is connected to a drain of the second FET 40.

In the switch circuit 30, the first FET 38 has a gate connected to an anode of the third diode D3, and a source connected to both a first end of the first resistor R1 and a first end of the third capacitor C3. A second end of the third capacitor C3 is connected to an inverting input of the differential amplifier 32, which is provided in the detection circuit 20. A second end of the first resistor R1 is grounded.

Further, in the switch circuit 30, the second FET 40 has a gate connected to an anode of the fourth diode D4, and a source connected to both a first end of the second resistor R2 and a first end of the fourth capacitor C4. A second end of the fourth capacitor C4 is connected to a non-inverting input of the differential amplifier 32, which is provided in the detection circuit 20. A second end of the second resistor R2 is connected to the second end of the first resistor R1, and both the second ends of the first and second resistors R1 and R2 are grounded.

Further, in the switch circuit 30, both an anode of the first diode D1 and an anode of the second diode D2 are connected to a first end of the fourth resistor R4. A second end of the fourth resistor R4 is connected to a node "a". Further, a first end of the fifth capacitor C5, a first end of the third resistor R3, a cathode of the third diode D3 and a cathode of the fourth diode D4 are also connected to the node "a". A second end of the fifth capacitor C5 and a second end of the third resistor R3 are grounded.

In the detection circuit 20, an output of the differential amplifier 32 is connected to an inverting input of the comparator 34. A reference voltage "Vref" is supplied to a non-inverting input of the comparator 34. An output of the comparator 34 is connected to an input of the waveform shaping circuit 36. An output of the waveform shaping circuit 36 is connected to the system control unit 24, which is shown in FIG. 1.

The capacitors C1 through C4 of the switch circuit 30 prevent the flow of a direct current between the mode motor 18 and the differential amplifier 32. The fifth capacitor C5 of the switch circuit 30 is provided to eliminate noises in the waveform of the alternating voltage generated by the mode motor 18. The third resistor R3 and the fourth resistor R4 are provided to adjust the sensitivity of the switch circuit 30.

When the cassette holder 14 is manually pushed in the insertion direction from the insert/eject position to the driver initiation position, the alternating voltage generated by the rotation of the mode motor 18 is supplied through the two FETs 38 and 40 to the differential amplifier 32. The differential amplifier 32 amplifies the alternating voltage, and the amplified alternating voltage is supplied to the inverting input of the comparator 34. As described above, the reference voltage "Vref" is supplied to the non-inverting input of the comparator 34. The output of the comparator 34 is connected to the input of the waveform shaping circuit 36. The waveform shaping circuit 36 outputs a low-level pulse signal when the alternating voltage at the inverting input of the comparator 34 is larger than the reference voltage Vref at the non-inverting input of the comparator 34. The waveform shaping circuit 36 outputs a high-level pulse signal when the alternating voltage is less than the reference voltage Vref. The pulsed signal from the output of the waveform shaping circuit 36 is supplied to the system control unit 24.

In the insertion detection apparatus shown in FIG. 1, the system control unit 24 receives the pulsed signal from the output of the detection circuit 20, and calculates a distance of the cassette holder 14 away from the insert/eject position in the insertion direction based on the received pulsed signal. The system control unit 24 determines whether the calculated distance of the cassette holder 14 has reached the predetermined distance between the insert/eject position and the driver initiation position. When it is determined that the calculated distance has reached the predetermined distance, the system control unit 24 outputs a drive-start signal to the motor driver 22.

When the drive-start signal output by the system control unit 24 is received at the motor driver 22, the motor driver 22 starts supplying a drive voltage on the order of 10 or 11 volts to the mode motor 18. The mode motor 18 is rotated at a given rotation speed by the drive voltage supplied by the motor driver 22. The rotation of the mode motor 18 is transmitted to the cassette holder 14 through the gears 16. The cassette holder 14 at the driver initiation position is further moved to the tape-loaded position within the housing 12 by the rotation of the mode motor 18. When the cassette holder 14 reaches the tape-loaded position, the system control unit 25 outputs a drive-end signal to the motor driver 22. In response to the drive-end signal received from the system control unit 24, the motor driver 22 stops the supplying of the drive voltage to the mode motor 18 so that the rotation of the mode motor 18 is stopped. As previously described, with the cassette holder 14 being set at the tape-loaded position, the recording/reproducing system can reproduce information recorded in the DAT of the cassette 26.

As described above, after the drive-start signal output by the system control unit 24 is received at the motor driver 22, the motor driver 22 supplies the drive voltage on the order of 10 or 11 volts to the mode motor 18. During the supply of the drive voltage to the mode motor 18, one of the first diode D1 and the second diode D2, in the switch circuit 30 of FIG. 3, is turned ON. The drive voltage supplied to the mode motor 18 at this time is adequately high to turn ON one of the first diode D1 and the second diode D2. The node "a", which is the connection point between the third resistor R3 and the fourth resistor R4, is set at a negative potential. Since the node "a" is set at the negative potential, both the gate of the first FET 38 and the gate of the second FET 40 are set to a negative voltage, and the first FET 38 and the second FET 40 are turned OFF, which functions to avoid the delivery of the drive voltage, supplied by the motor driver 22, to the differential amplifier 32 through the switch circuit 30. Therefore, when the motor driver 22 supplies the drive voltage to the mode motor 18, the switch circuit 30 is set in the OFF state, and the delivery of the drive voltage from the switch circuit 30 to the differential amplifier 32 of the detection circuit 20 is avoided. The switch circuit 30 in the present embodiment prevents the damaging of the differential amplifier 32 due to an excessively high drive voltage delivered to the detection circuit 20.

Figure 4:
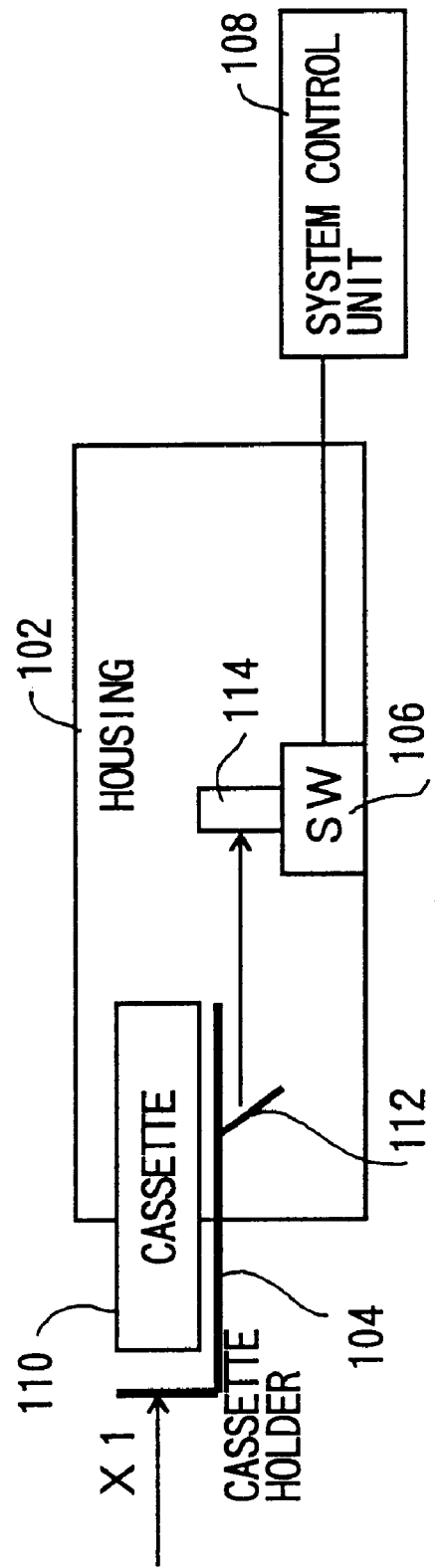
FIG. 4 is a block diagram of a conventional recording-medium-holder insertion detection apparatus.

In the above-described embodiment, the system control unit 24 calculates a distance of the cassette holder 14 away from the insert/eject position in the insertion direction based on the received pulsed signal, and determines whether the calculated distance of the cassette holder 14 has reached the predetermined distance. When it is determined that the calculated distance has reached the predetermined distance, the system control unit 24 starts outputting the drive signal to the mode motor 18 through the motor driver 22. It is not necessary for the above-described embodiment to provide the projection 112 in the cassette holder 104 and the position-sensing switch 106 in the housing 102 as in the conventional apparatus shown in FIG. 4. The system control unit 14 can provide safe, reliable detection of the insertion of the cassette holder 14 based on the pulsed signal received from the detection circuit 20.

Accordingly, the insertion detection apparatus of the present embodiment is effective in providing a safe, reliable detection of the insertion of the cassette holder in the recording/reproducing system by using a lightweight, inexpensive structure.

In the above-described embodiment, the detection circuit 20 and the system control unit 24 are configured as being separate modules. Alternatively, they may be configured into a single module. Further, in the above-described embodiment, the detection circuit 20 and the switch circuit 30 are configured as being separate modules. Alternatively, they may be configured into a single module.

Further, the insertion detection apparatus according to the present invention does not necessarily require the switch circuit 30. In such a modification, the insertion detection apparatus is configured so that a suitable switch is provided between the mode motor 18 and the detection circuit 20. When the motor driver 22 starts supplying the drive voltage to the mode motor 18, the system control unit 24 supplies a switch-off signal to the switch, which is provided between the mode motor 18 and the detection circuit 20, so as to set the switch in OFF state. In this modification, the system control unit 24 and the switch serve to avoid the delivery of the drive voltage from the switch to the differential amplifier 32 of the detection circuit 20.

Further, the insertion detection apparatus according to the present invention may be configured such that a predetermined level of voltage is supplied from the mode motor 18 to the detection circuit 20, regardless of the operating condition of the motor driver 22. In such a modification, the system control unit 24 can detect the position of the cassette holder 14 in conformity with an operating mode of the recording/reproducing system, such as a stop mode or a play mode, based on the pulsed signal received from the detection circuit 20.

The present invention is not limited to the above-described embodiments, and variations and modifications may be made without departing from the scope of the present invention.

Further, the present invention is based on Japanese priority application No.11-194745, filed on Jul. 8, 1999, the entire contents of which are hereby incorporated by reference.

What is claimed is:

1. An apparatus for detecting an insertion of a recording-medium holder in a recording/reproducing system, comprising:
    a motor which is engaged with the recording-medium holder, placed at a first position within the recording/producing system, the motor moving the holder in an insertion direction from the first position when the motor is rotated by a drive voltage, and the motor generating an alternating voltage when the motor is rotated by a manual insertion of the holder so as to reach a second position;
    a detection circuit for outputting a pulsed signal in response to the alternating voltage generated by the motor,
    wherein the detection circuit includes a differential amplifier having inputs connected to the motor, a comparator having an input connected to an output of the amplifier, and a waveform shaping circuit having an input connected to an output of the comparator and
    wherein the detection circuit supplies a pulsed signal from an output of the waveform shaping circuit to a determination unit when the alternating voltage generated by the motor is received at the inputs of the differential amplifier; and
    the determination unit for calculating a distance of the holder away from the first position in the insertion direction based on the pulsed signal output by the detection circuit, and for outputting a drive-start signal when the calculated distance has reached a predetermined distance between the first position and the second position.

2. The apparatus according to claim 1, further comprising a switch circuit provided between the motor and the detection circuit, the switch circuit being set in OFF state when the motor is rotated by the drive voltage, so as to prevent the delivery of the drive voltage from the motor to the detection circuit through the switch circuit.

3. The apparatus according to claim 2, wherein, when the motor is rotated by the manual insertion of the holder so as to reach the second position, the switch circuit is set in ON state so that the alternating voltage generated by the motor is supplied to the detection circuit through the switch circuit.

4. The apparatus according to claim 1, further comprising a motor driver provided between the motor and the determination unit, the motor driver starting supplying of the drive voltage to the motor when the drive-start signal is output to the motor driver by the determination unit.

5. The apparatus according to claim 1, wherein, when the drive-start signal is output by the determination unit, the rotation of the motor is started by the drive voltage so that the holder is further moved from the second position to a third position by the rotation of the motor.

6. The apparatus according to claim 5, wherein, when the holder reaches the third position, the determination unit outputs a drive-end signal to a motor driver provided between the motor and the determination unit, the motor driver stopping the supplying of the drive voltage to the motor so that the rotation of the motor is stopped.

* * * * *